Jan. 13, 1959  J. A. TOMCHAK  2,867,914
TIRE DEFROSTER, CLEANER AND DRYER
Filed Dec. 31, 1956  2 Sheets-Sheet 1
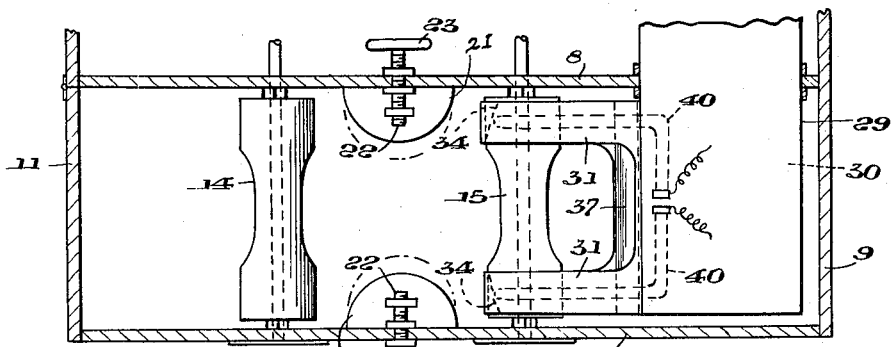
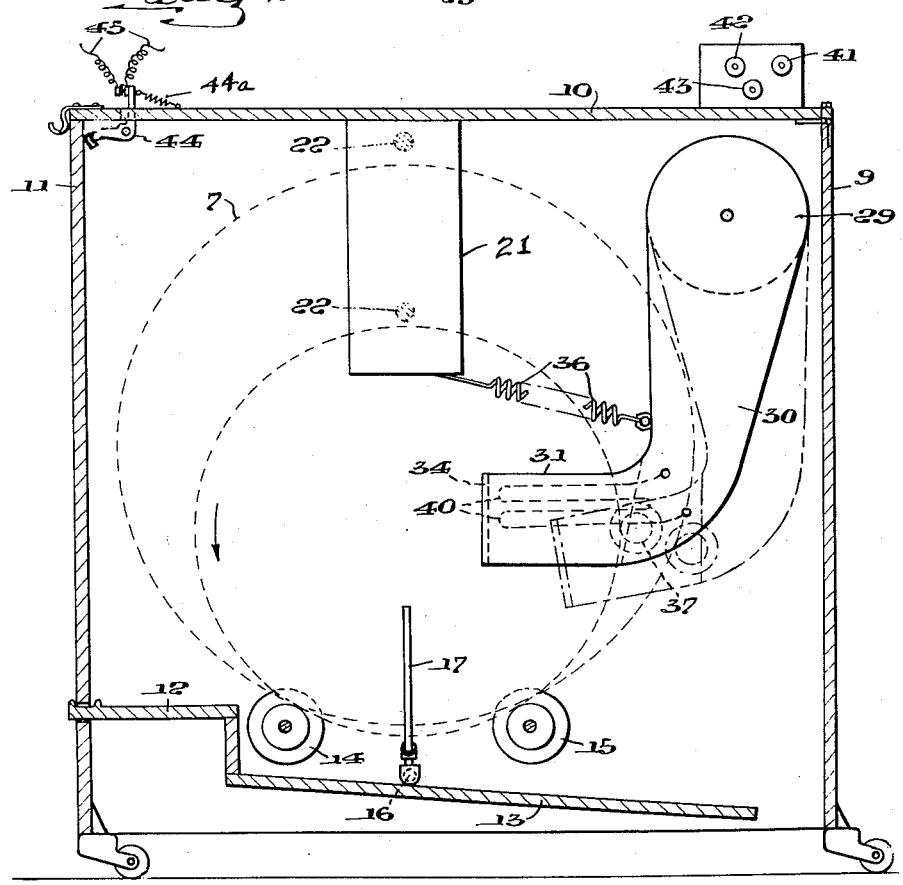
INVENTOR.
JOSEPH A. TOMCHAK
BY *Archworth Martin*
his ATTORNEY.

Jan. 13, 1959 J. A. TOMCHAK 2,867,914
TIRE DEFROSTER, CLEANER AND DRYER
Filed Dec. 31, 1956 2 Sheets-Sheet 2
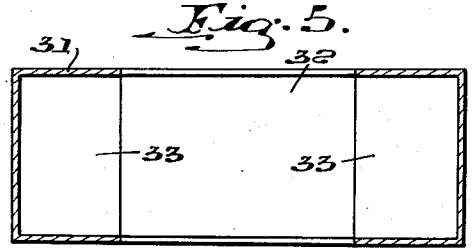
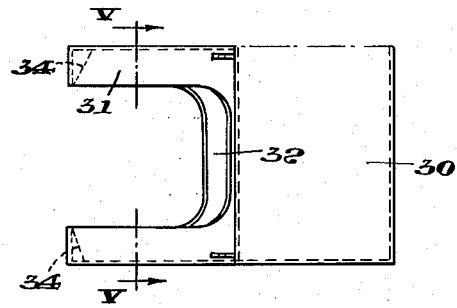
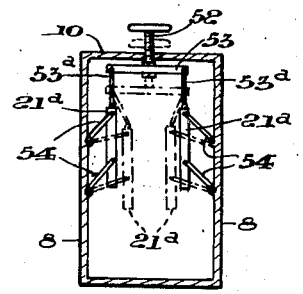
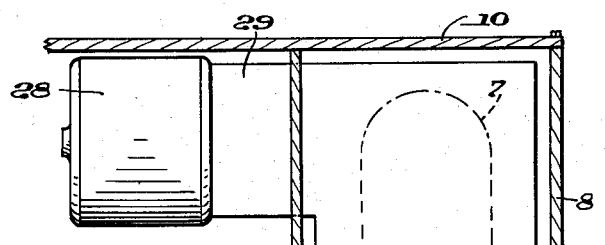
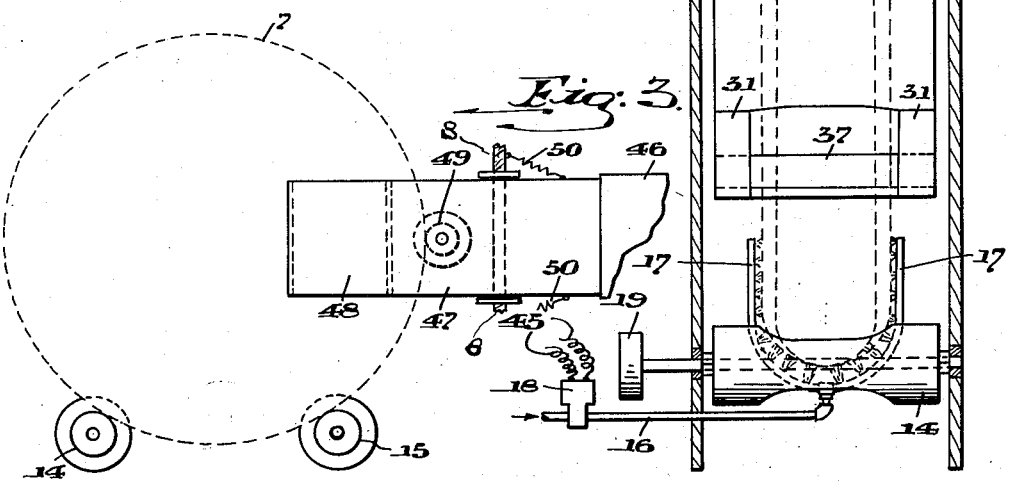
INVENTOR.
JOSEPH A. TOMCHAK.
BY Archworth Martin
his ATTORNEY United States Patent Office 2,867,914
Patented Jan. 13, 1959

2,867,914

TIRE DEFROSTER, CLEANER, AND DRYER

Joseph A. Tomchak, McKees Rocks, Pa.

Application December 31, 1956, Serial No. 631,781

4 Claims. (Cl. 34—104)

My invention relates to apparatus for treating motor vehicle tires, for the purpose of thawing, cleaning and drying the same in order to remove them when frozen upon a wheel and for cleaning them and for drying them in a simple cleaning operation, or to facilitate tire changes, or prepare the tires to a clean and dry condition for repairing. The invention comprises a modification of an improvement upon my application Ser. No. 461,548, filed October 11, 1954 (now Patent No. 2,779,103).

The invention has for one of its objects an improved arrangement of apparatus, whereby a tire or a wheel with or without a tire mounted thereon, can easily be rolled into position for treatment and conveniently rotated in a cabinet while being thawed, cleaned and dried.

Another object of my invention is to provide an improved apparatus for treating tires in an economical and rapid manner.

Some of the forms which my invention may take are shown in the accompanying drawings wherein:

Figure 1 is a side elevational view of the apparatus partly in section.

Fig. 2 is a sectional plan.

Fig. 3 is an end elevational view, in section.

Fig. 4 is a plan view of a portion of the air-conducting ducts of Fig. 1.

Fig. 5 is a view taken on the line V—V of Fig. 4.

Fig. 6 is a fragmentary view showing a modification of a portion of the apparatus of Fig. 1.

Fig. 7 shows a modification of Figures 1 and 2.

As shown in Figures 1 to 5, the apparatus comprises a housing having side walls 8, an end wall 9 and a top wall 10. One end wall comprises a door 11, and 12 is a part bottom wall, a drain board 13 also being at the bottom of the housing.

Rollers 14 and 15 are journaled in the side walls 8, in position to support a tire, or a wheel and tire such as indicated at 7, the tire being rolled into position in the housing when the door 11 is not in place.

A steam or hot-water pipe 16 is supplied with fluid under pressure from a suitable source and discharges into a U shaped spray or jet pipe 17, while the tire is being rotated through a pulley 19 and the roller 14. Flow through the pipe 16 is electrically controlled by a magnetically operated valve 18.

Guide blocks 21 are provided in the upper part of the housing to hold the tire in upright position. These guides are adjustable to different width tires by means of screws 22 which have handwheels 23 to move the guide blocks toward and from their dotted line positions shown in Fig. 2.

A blower 28 is provided that supplies air through a conduit 29 having a depending portion 30 that has legs 31. Air is directed against the sides and the tread of the tire through opening 32 at the lower end of conduit 30 and openings 33 in the sides of the legs.

The outer ends of the legs 31 are closed by sloping walls which deflect the air against the tire sides. The conduit 29 is swiveled in the side walls of the casing and the member 30 urged inwardly by a spring 36 that is hooked to one of the guide blocks 21.

A roller 37 is journaled in the legs 31, about where they merge with the member 30. This roller serves as a anti-friction guide and stop-member which will allow the legs to be held alongside the tire, in a suitable position, whether the tire is a small one or a large one, as indicated by the dash lines in Fig. 1. The air is heated by electrical resistor elements 40, to effect rapid drying of a tire. Current to the heating coil is controlled by a turn button switch 41. A switch 42 controls current to the electric blower 28 and a switch and a safety switch 44, controls flow of current through conductors 45 to the magnet valve 18.

The safety switch is closed to complete the circuit only when the door 11 is closed. When the door 11 is open, the switch at 44 is opened by a spring 44a thus preventing opening of the valve 18 and avoiding injury to a workman by steam from the cabinet, in case someone closes the switch 43 at that time.

In Fig. 6, I show a straight-line conduit 46 discharging through conduit 47 that has slide fit in the wall 8 and at its forward end carries conduit legs 48 that correspond to the legs 31 of the other figures, the conduit members discharging the heated air against the tread and sides of the tire. A positioning roller 49 is located in 47 and corresponds to the roller 37 of Figures 1 and 2. The roller 49 is automatically held against tires of different diameters by tension springs 50 that are connected to the wall 8 and conduit 47.

It will be understood that in addition to using the apparatus in connection with tires of various types whether mounted or unmounted on wheels, it can be used in the washing and drying of inner-tubes.

Fig. 7 shows a modification of the devices of Fig. 2 for moving the guide blocks 21a toward and from each other, to engage tires of different widths. A screw 52 is threaded in the top 10 of the casing and is rotatably connected to a bar 53 which has links 53a that carry the guide blocks 21a that are connected by links 54 to the sides 8 of the housing. When the bar 53 is raised and lowered through turning of the screw 52, the blocks will be moved toward and from each other.

I claim as my invention:

1. Tire treating apparatus that comprises a cabinet, rollers therein for supporting a tire, means for rotating one of the rollers and thereby rotating the tire about its axis, jet members positioned to discharge against the sides of the tire and disposed in a radial direction for a substantial distance alongside the tire, a conduit that supports the jet members and serves to direct fluid under pressure to the jets, means for supporting the conduit for movement in said radial direction, a spring that yieldably urges the conduit toward the tire tread, and a roller carried by the conduit in position to be engaged by the tire tread and thereby serve as a stop member that limits movement of the conduit toward the tire tread.

2. Tire treating apparatus that comprises a cabinet having means therein for supporting a tire for rotation about its axis, in an upright position, conduit members positioned to direct cleaning and drying fluid against the tread and sides of a tire while it is being rotated, and means that normally hold the conduit members in position to be engaged by a tire tread while the tire is being positioned in the cabinet, the said conduit members being movable from said normal position upon engagement thereof by a tire of greater than a predetermined diameter, when mounting the tire in its said upright position for rotation.

3. Tire treating apparatus as recited in claim 2, wherein the conduit comprises a vertical passageway that is pivotally supported at its upper end on an axis parallel to the axis of the tire, and whose lower end extends laterally along both sides of the tire and discharges through said jet members.

4. Apparatus as recited in claim 2, wherein there are guide members in the upper portion of the cabinet in position to engage the sides of a tire and hold it against tilting sidewise, together with means for simultaneously and uniformly adjusting the guide members toward and from each other.

References Cited in the file of this patent

UNITED STATES PATENTS

| | | |
|---|---|---|
| 1,753,176 | Stevens | Apr. 1, 1930 |
| 2,779,103 | Tomchak | Jan. 29, 1957 |